Nov. 19, 1935.  A. WORGAN  2,021,534
MAGNETICALLY OPERATED FRICTION CLUTCH
Filed May 23, 1934    2 Sheets-Sheet 1
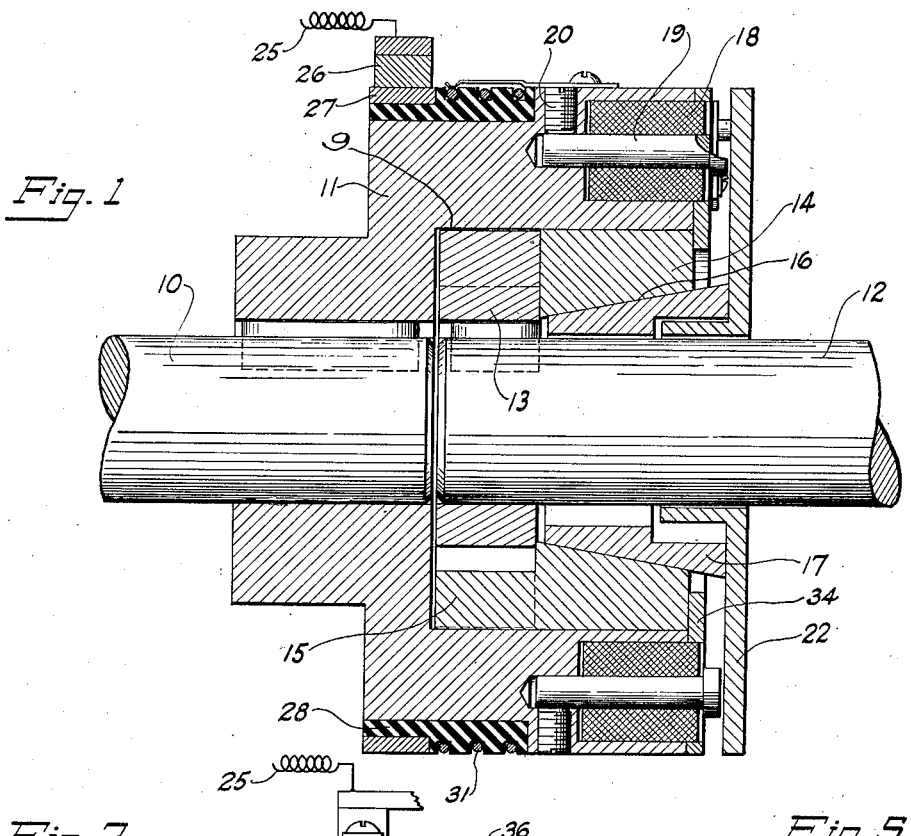
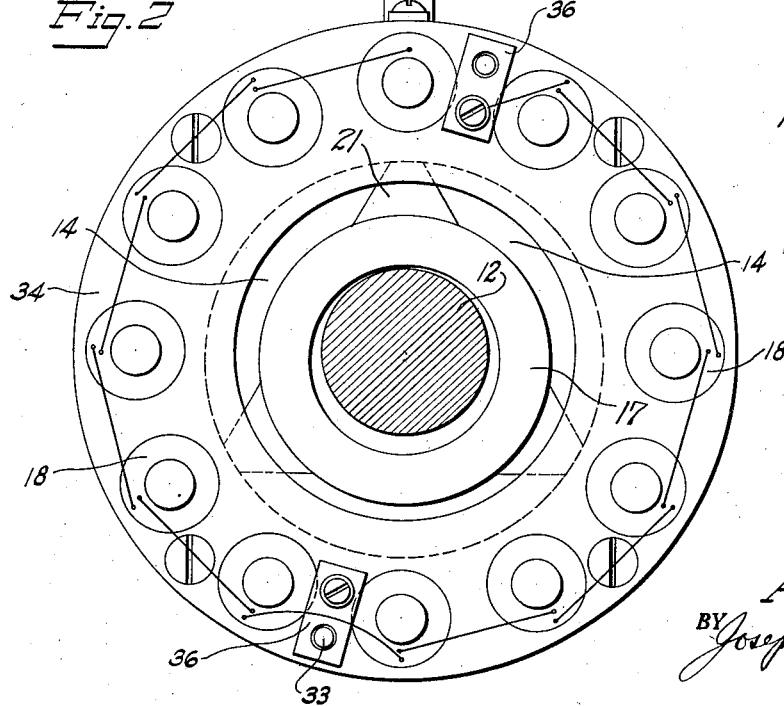
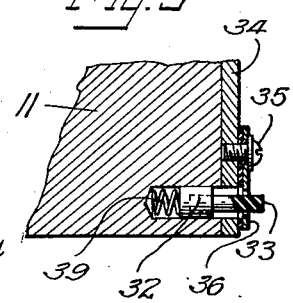
INVENTOR.
Arthur Worgan
BY Joseph K. Schofield
ATTORNEYS.

Nov. 19, 1935.  A. WORGAN  2,021,534
MAGNETICALLY OPERATED FRICTION CLUTCH
Filed May 23, 1934    2 Sheets-Sheet 2
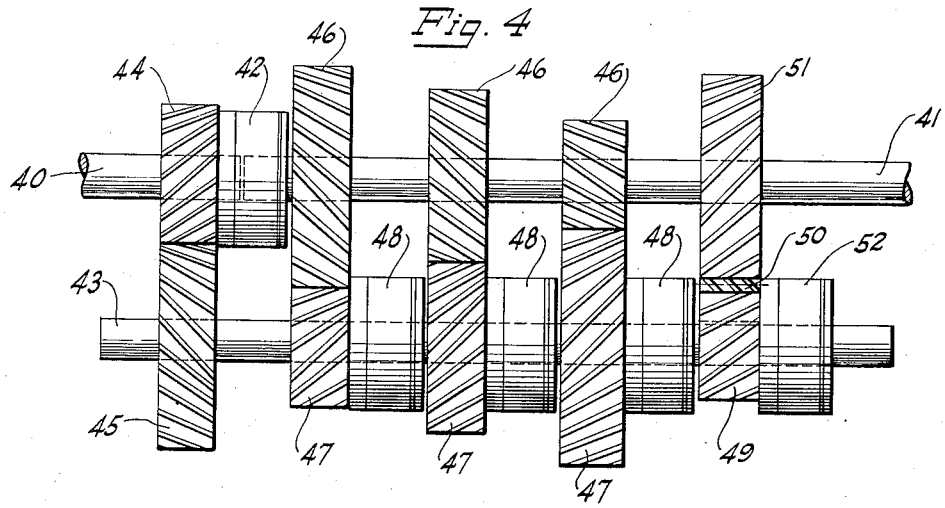
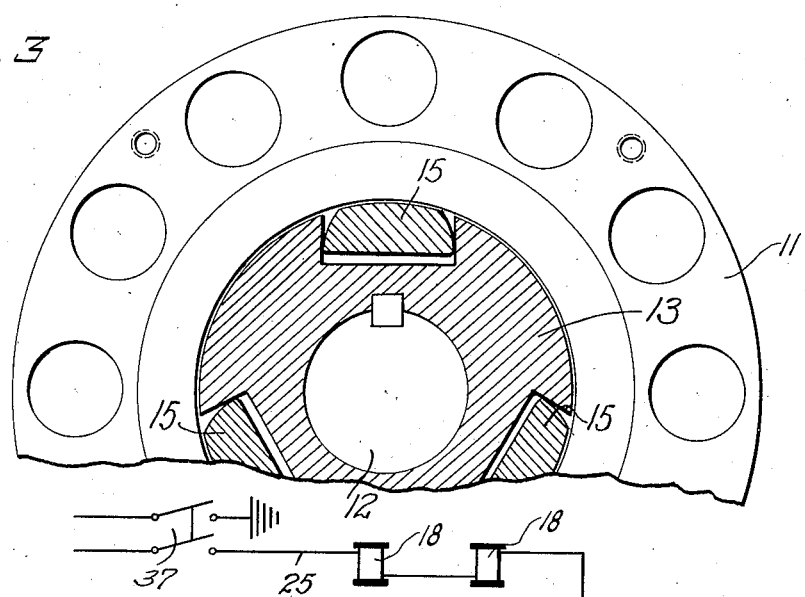
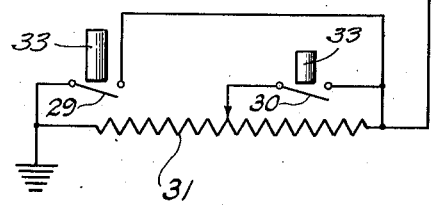
INVENTOR.
Arthur Worgan
BY
ATTORNEYS.

Patented Nov. 19, 1935

2,021,534

UNITED STATES PATENT OFFICE 2,021,534

MAGNETICALLY OPERATED FRICTION CLUTCH

Arthur Worgan, Manchester, Conn.

Application May 23, 1934, Serial No. 727,043

4 Claims. (Cl. 192—84)

This invention relates to friction clutches and particularly to a magnetically operated clutch adapted for multiple speed transmissions as for automobile driving mechanism.

A primary object of the invention is to provide an efficient friction clutch, the members of which are moved into frictional engagement and released from engagement by energizing and de-energizing one or more electro-magnets carried within a rotating member of the clutch.

A further object of the invention is to provide a member on the driven part of the clutch rotatable within an eccentric recess extending longitudinally of the driving part of the clutch so that when rotation of one part of the clutch takes place relative to the other part this member will be movable axially of the shafts on which the clutch is mounted, this movement being made use of to operate an overload or underload switch.

And finally it is an object of the invention to provide switches controlled by movement of a member forming the armature of the electro-magnets to regulate the current supplied to the magnets.

With the above and other objects in view my invention includes the features of construction and operation set forth in the following specification and illustrated in the acompanying drawings.

In the accompanying drawings annexed hereto and forming a part of this specification, I have shown my invention embodied in a multispeed transmission for automobiles, but it will be understood that the invention can be otherwise embodied and that the drawings are not to be construed as defining or limiting the scope of the invention, the claims appended to this specification being relied upon for that purpose.

In the drawings:—

Fig. 1 is a longitudinal sectional view of the clutch forming a principal part of the present invention.

Fig. 2 is a transverse view of the clutch shown in Fig. 1 looking from the right hand side of Fig. 1 but with the cover plate or armature removed.

Fig. 3 is a transverse view of the clutch body member and parts inserted therein.

Fig. 4 is a typical transmission gearing to which a clutch such as shown in Figs. 1, 2 and 3 may be employed and Fig. 5 is a detail of one of the switches used with the clutch and operated when the magnets of the clutch are energized, and Fig. 6 is a wiring diagram of the clutch.

In the above mentioned drawings I have shown but one embodiment of the invention in complete form which is now deemed preferable, but it is to be understood that changes and modifications may be made within the scope of the appended claims without departing from the spirit of the invention.

Briefly and in its broadest aspect, my invention may include the following principal parts: first a member keyed directly to a driving shaft and having a cylindrical recess formed therein, the axis of which is parallel to and at a slight distance from the axis of the driving shaft; second, a series of electromagnets housed within the driving part of the clutch; third, a member keyed to the driven shaft and disposed within the recess of the driving part of the clutch; fourth, a series of arcuate members fittting within the recesses of the driving part and interengaging radial slots within the member keyed to the driven shaft so that these arcuate members are constrained to rotate with the driven shaft but are radially adjustable; fifth, a conical member fitting over the driven shaft and having its conical surface frictionally engaging surfaces of the arcuate members; sixth, a plate or flange fittting over the driven shaft and engaging against the end or face of the conical member, this flange extending closely adjacent the electromagnets and forming the armature therefor; and seventh, a circuit for energizing the electromagnets and including switches controlled by movement of the flange member and a resistance included in or excluded from the circuit by operation of the switches.

Referring more in detail to the figures of the drawings, I provide a shaft 10 forming the driving element for the clutch. This shaft 10 has keyed thereon a recessed member 11 forming the driving part of the clutch, this member 11 being retained against axial movement on the shaft 10 by any suitable means not shown. The recess 9 formed within this member 11 is cylindrical and open at the end opposite that from which the shaft 10 extends. The axis of this recess is slightly eccentric to but parallel to the axis of the driving shaft 10 and also the driven shaft 12.

Keyed to the driven shaft 12 at its end adjacent the driving shaft 10 and fitting loosely within the recess of member 11 is a radially slotted member 13. Also within the recess 9 and engaging its cylindrical surface are arcuate members 14, three of these being shown in position. Each of these arcuate members 14 has an extension 15 fitting between the radial projections of member 13 so that rotation of the member 13 will force the members 14 to rotate and, by means presently to be described will rotate the shaft 12. Also, each member 14 has a fragmentary conical surface 16, these surfaces being engaged by a conical member 17 loosely surrounding the shaft 12. It will be seen also from Fig. 1 that inward movement of the conical member 17 toward the member 11 will spread the arcuate member 14 and cause them to frictionally engage the inner cylindrical surface of member 11.

As shown in Fig. 2 the arcuate members 14 are retained in spaced apart positions by interposed members 21.

Electromagnetic means are employed to force the member 17 inward between the arcuate members 14 and for that purpose a series of electromagnets may be housed within the member 11. As shown in the figures of the drawings, a circular series of electromagnets 18 are provided equally spaced adjacent the open end of member 11. The coils of these magnets are connected in series within a circuit presently to be more fully described. Preferably and as shown the coils of the magnets 18 have their axes parallel to the axis of shafts 11 and 12 and have a steel or iron stud 19 forming part of the magnetic system retained within the member 11 as by individual screws 20. By means of these screws the coils 18 are retained against removal from the member 11.

Loosely slidable on driven shaft 12 is a steel or iron flanged member 22 forming the armature for the magnets 18, the hub of which engages the shaft 12 and the outer periphery extends to and beyond the electro-magnets 18 housed within member 11. It will be seen from the above construction that by energizing the magnets 18 the flanged member 22 will be strongly pulled toward the member 11. This movement of member 22 will force conical member 17 inward and thus force the arcuate members 14 radially outward into frictional contact with the cylindrical surface of the recess 9 formed in member 11. The axes of the driving shaft 10 and the driven shaft 12 are in alignment and the axis of the recess 9 in member 12 is slightly eccentric but parallel thereto.

As the conical member 17 forces the arcuate members 14 radially outward and with the member 11 being rotated by shaft 10 the members 14 are forced to rotate due to their frictional engagement with the internal cylindrical surface of member 11. As the flanged member 22 continues to be forced toward member 11, the force of the arcuate members 14 upon the surface of member 11 continues. This frictional contact is sufficient under normal loads of the clutch to bring the driven shaft 12 up to the same speed as the driving shaft 10.

The circuit for energizing the magnets 18 is preferably grounded, the lead in wire 25 having a slip ring connection through brush 26 with a metal ring 27 around the driving member 11. As shown in Fig. 1, the ring 27 is set into a block of insulating material 28 secured directly to the member 11. The circuit is shown diagrammatically in Fig. 6 in which two switches 29 and 30 are indicated adapted to shunt all or part of resistance 31 which may be wrapped around the insulator block 28. In detail the switches 29 and 30 may be as shown in Fig. 5 in which a metal plunger 32 having a stem 33 of insulating material is movable parallel to the axis of member 11. The plungers 32 may normally be forced outwardly by suitable springs 39 housed within the recesses for the plungers. Insulated from the driving member 11 and preferably secured within the cover plate 34 as by screw 35 is a small metal plate 36 adjacent said switch. This plate 36 is within the circuit for the magnets 18 and when the plunger 32 is in its outermost position connects the plate 36 electrically with the member 11, which as stated is grounded. In the inner position of plunger 32 which is shown in Fig. 5, the switch is open.

The switches 29 and 30 are adapted to be opened and closed by movement of the armature member 22. As will be noted in Fig. 6, one of the stems 33 of the switches 29 and 30 is longer than the other. The first movement of the plate or armature member 22 after main switch 37 shown in Fig. 6 is closed therefore will be to contact with and force the longer stem inward, thus opening one of the switches, namely switch 29. Further movement of member 22 toward the magnets 18 will depress the shorter stem and open switch 30. The clutch therefore when the magnets 18 are first energized will have the full effect of the current through the circuit as the entire length of resistance 31 will be shunted. The driven shaft 12 will therefore be brought up to speed as promptly as possible. With switch 29 opened after armature 22 has moved toward the magnets 18 the clutch will be supplied with a reduced amount of current due to a part of the resistance 31 being included in the circuit. With the member 22 moved to and held in its position closely adjacent the magnets 18 the switch 30 will be opened and the current still further reduced as all of the resistance element 31 is included in the circuit for the magnets.

Fig. 4 shows a typical transmission provided with the above described friction clutch for each speed. In this figure 40 indicates the driving shaft and 41 the driven shaft which is in alignment therewith. A clutch 42 when energized enables these shafts to be directly connected for operation at equal speeds. A counter shaft 43 is provided parallel to the driving and driven shafts 40 and 41, which may be driven by a gear 44 keyed to the driving shaft 40 in mesh with a gear 45 secured on the counter shaft 43. On the driven shaft 41 are a plurality of gears 46, three being shown of different diameters. These gears 46 mesh respectively with gears 47 disposed rotatively on shaft 43 and adapted to be clutched individually thereto by separate clutches 48 similar to clutch 42. By energizing any one of clutches 48 the shaft 41 may be rotated at speeds materially different from that of shaft 40. In order to obtain reverse rotation of shaft 41 a gear 49 rotatably mounted on shaft 43 meshes with an intermediate gear 50 (fragmentarily shown) which in turn meshes with a gear 51 on shaft 41. A clutch 52 on shaft 43 when energized couples gear 49 to this shaft and through the intermediate gear 50 rotates shaft 41 in a direction opposite that of shaft 40. From the above described construction it will be seen that by energizing any one of the clutches 42, 48 or 52 shaft 41 may be rotated at a selected forward speed or in the opposite or reverse direction at a speed reduced from that of shaft 40.

I claim:—

1. A magnetically operated friction clutch comprising in combination, a driving member, a driven member co-axial therewith, radially adjustable members rotatable with said driven member and housed within said driving member, electro-magnets within said driving member, an armature moved toward said driving member when said magnets are energized, an axially movable member engaging and forcing said adjustable members outward upon movement of said armature toward the driving member, and switches controlling a resistance in the circuit for said magnets, said switches being opened and closed by movement of said armature.

2. A magnetically operated friction clutch comprising in combination, a driving member, a driven member co-axial therewith, radially adjustable members rotatable with said driven member and housed within said driving member for frictional engagement therewith, electromagnets, an axially movable member forming the armature of said magnets, a conical member moved by said armature movement of which forces said radially adjustable members outwardly, a resistance element mounted on said driving member in the circuit for said magnets, and switch means to include a portion of said element when said armature is moved toward said magnets.

3. A magnetically operated friction clutch comprising in combination, a driving member, a driven member co-axial therewith, radially adjustable members rotatable with said driven member and housed within said driving member, electro-magnets mounted within one of said members, an axially movable member forming the armature of said magnets, a conical member moved by said armature movement of which toward said magnets forces said radially adjustable members outwardly into contact with said driving member, a resistance element mounted on said driving member in the circuit for said magnets, switch means to include a portion of said element when said armature is moved partially toward said magnets, and a second switch means to include all of said resistance element when said armature is moved to its final position adjacent the magnets.

4. A magnetically operated friction clutch comprising in combination, a driving member, a driven member co-axial therewith, radially adjustable members rotatable with said driven member and housed within said driving member, electro-magnets mounted in said clutch, an axially movable member forming the armature of said magnets, a conical member moved by said armature movement of which forces said radially adjustable members into contact with said driving member, a resistance element mounted in said driving member in the circuit for said magnets and switches in said circuit opened by movement of said armature toward said magnets to include portions of said element in said circuit.

ARTHUR WORGAN.